(12) United States Patent
Ikemoto

(10) Patent No.: US 9,178,279 B2
(45) Date of Patent: Nov. 3, 2015

(54) WIRELESS IC TAG, READER-WRITER, AND INFORMATION PROCESSING SYSTEM

(75) Inventor: Nobuo Ikemoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 955 days.

(21) Appl. No.: 13/329,354

(22) Filed: Dec. 19, 2011

(65) Prior Publication Data

US 2012/0086556 A1 Apr. 12, 2012

Related U.S. Application Data

(63) Continuation of application No. PCT/JP2010/069417, filed on Nov. 1, 2010.

(30) Foreign Application Priority Data

Nov. 4, 2009 (JP) ................................. 2009-253227
Mar. 31, 2010 (JP) ................................. 2010-084009

(51) Int. Cl.
*G06K 7/01* (2006.01)
*H01Q 7/00* (2006.01)
(Continued)

(52) U.S. Cl.
CPC ................. *H01Q 7/00* (2013.01); *G01S 13/751* (2013.01); *G06K 19/07749* (2013.01); *G06K 19/07779* (2013.01); *G06K 19/07783* (2013.01); *G06K 19/07784* (2013.01); *H01Q 1/2216* (2013.01); *H01Q 1/2225* (2013.01);
(Continued)

(58) Field of Classification Search
CPC ................. G06K 19/07749; G06K 19/07779; G06K 19/07783; G06K 19/07784; G06K 7/10316; G06K 7/10326; G06K 7/10336; H01Q 1/2216; H01Q 7/00; H01Q 1/2225
USPC ................. 340/10.1, 10.2, 10.3, 10.4, 572.1, 340/572.3, 572.7
See application file for complete search history.

(56) References Cited

U.S. PATENT DOCUMENTS 3,364,564 A 1/1968 Kurtz et al.
4,643,526 A * 2/1987 Watanabe et al. ............. 349/151
(Continued)

FOREIGN PATENT DOCUMENTS

CA 2 279 176 A1 7/1998
DE 10 2006 057 369 A1 6/2008
(Continued)

OTHER PUBLICATIONS

Official Communication issued in International Patent Application No. PCT/JP2008/063025, mailed on Aug. 12, 2008.
(Continued)

*Primary Examiner* — Nabil Syed
(74) *Attorney, Agent, or Firm* — Keating & Bennett, LLP

(57) ABSTRACT

A wireless IC tag includes a wireless IC chip and two coil-shaped antennas. One end of each of the coil-shaped antennas is electrically connected to the wireless IC chip, and the other ends of the coil-shaped antennas are electrically connected to each other. The winding axes of the coil-shaped antennas are arranged at different positions, and the coil-shaped antennas have the same winding direction. A reader-writer includes an antenna connected to an information processing circuit. The antenna is electromagnetically coupled to the coil-shaped antennas for communication.

13 Claims, 10 Drawing Sheets

(51) Int. Cl.
*G06K 19/077* (2006.01)
*H01Q 1/22* (2006.01)
*H04B 5/00* (2006.01)
*G01S 13/75* (2006.01)

(52) U.S. Cl.
CPC ............ *H04B 5/0056* (2013.01); *H04B 5/0087* (2013.01); *Y02B 60/50* (2013.01)

(56) References Cited

U.S. PATENT DOCUMENTS

| | | | |
|---|---|---|---|
| 4,794,397 A | 12/1988 | Ohe et al. | |
| 5,232,765 A | 8/1993 | Yano et al. | |
| 5,253,969 A | 10/1993 | Richert | |
| 5,337,063 A | 8/1994 | Takahira | |
| 5,374,937 A | 12/1994 | Tsunekawa et al. | |
| 5,399,060 A | 3/1995 | Richert | |
| 5,491,483 A | 2/1996 | D'Hont | |
| 5,528,222 A | 6/1996 | Moskowitz et al. | |
| 5,757,074 A | 5/1998 | Matloubian et al. | |
| 5,854,480 A | 12/1998 | Noto | |
| 5,903,239 A | 5/1999 | Takahashi et al. | |
| 5,936,150 A | 8/1999 | Kobrin et al. | |
| 5,955,723 A | 9/1999 | Reiner | |
| 5,995,006 A | 11/1999 | Walsh | |
| 6,104,311 A | 8/2000 | Lastinger | |
| 6,107,920 A | 8/2000 | Eberhardt et al. | |
| 6,172,608 B1 | 1/2001 | Cole | |
| 6,173,897 B1 * | 1/2001 | Halpern | 235/488 |
| 6,181,287 B1 | 1/2001 | Beigel | |
| 6,190,942 B1 | 2/2001 | Wilm et al. | |
| 6,249,258 B1 | 6/2001 | Bloch et al. | |
| 6,259,369 B1 | 7/2001 | Monico | |
| 6,271,803 B1 | 8/2001 | Watanabe et al. | |
| 6,335,686 B1 | 1/2002 | Goff et al. | |
| 6,362,784 B1 | 3/2002 | Kane et al. | |
| 6,367,143 B1 | 4/2002 | Sugimura | |
| 6,378,774 B1 | 4/2002 | Emori et al. | |
| 6,406,990 B1 | 6/2002 | Kawai | |
| 6,448,874 B1 | 9/2002 | Shiino et al. | |
| 6,452,563 B1 | 9/2002 | Porte | |
| 6,462,716 B1 | 10/2002 | Kushihi | |
| 6,542,050 B1 | 4/2003 | Arai et al. | |
| 6,600,459 B2 | 7/2003 | Yokoshima et al. | |
| 6,634,564 B2 | 10/2003 | Kuramochi | |
| 6,664,645 B2 | 12/2003 | Kawai | |
| 6,763,254 B2 | 7/2004 | Nishikawa | |
| 6,812,707 B2 | 11/2004 | Yonezawa et al. | |
| 6,828,881 B2 | 12/2004 | Mizutani et al. | |
| 6,837,438 B1 | 1/2005 | Takasugi et al. | |
| 6,861,731 B2 | 3/2005 | Buijsman et al. | |
| 6,927,738 B2 | 8/2005 | Senba et al. | |
| 6,963,729 B2 | 11/2005 | Uozumi | |
| 7,088,249 B2 | 8/2006 | Senba et al. | |
| 7,088,307 B2 | 8/2006 | Imaizumi | |
| 7,112,952 B2 | 9/2006 | Arai et al. | |
| 7,119,693 B1 | 10/2006 | Devilbiss | |
| 7,129,834 B2 | 10/2006 | Naruse et al. | |
| 7,248,221 B2 | 7/2007 | Kai et al. | |
| 7,250,910 B2 | 7/2007 | Yoshikawa et al. | |
| 7,276,929 B2 | 10/2007 | Arai et al. | |
| 7,317,396 B2 | 1/2008 | Ujino | |
| 7,405,664 B2 | 7/2008 | Sakama et al. | |
| 2002/0011967 A1 | 1/2002 | Goff et al. | |
| 2002/0015002 A1 | 2/2002 | Yasukawa et al. | |
| 2002/0044092 A1 | 4/2002 | Kushihi | |
| 2002/0067316 A1 | 6/2002 | Yokoshima et al. | |
| 2002/0093457 A1 | 7/2002 | Hamada et al. | |
| 2003/0006901 A1 | 1/2003 | Kim et al. | |
| 2003/0020661 A1 | 1/2003 | Sato | |
| 2003/0045324 A1 | 3/2003 | Nagumo et al. | |
| 2003/0169153 A1 | 9/2003 | Muller | |
| 2004/0001027 A1 | 1/2004 | Killen et al. | |
| 2004/0026519 A1 | 2/2004 | Usami et al. | |
| 2004/0056823 A1 | 3/2004 | Zuk et al. | |
| 2004/0066617 A1 | 4/2004 | Hirabayashi et al. | |
| 2004/0217915 A1 | 11/2004 | Imaizumi | |
| 2004/0219956 A1 | 11/2004 | Iwai et al. | |
| 2004/0227673 A1 | 11/2004 | Iwai et al. | |
| 2004/0252064 A1 | 12/2004 | Yuanzhu | |
| 2005/0040997 A1 | 2/2005 | Akiho et al. | |
| 2005/0092836 A1 | 5/2005 | Kudo | |
| 2005/0099337 A1 | 5/2005 | Takei et al. | |
| 2005/0125093 A1 | 6/2005 | Kikuchi et al. | |
| 2005/0134460 A1 | 6/2005 | Usami | |
| 2005/0134506 A1 | 6/2005 | Egbert | |
| 2005/0138798 A1 | 6/2005 | Sakama et al. | |
| 2005/0140512 A1 | 6/2005 | Sakama et al. | |
| 2005/0232412 A1 | 10/2005 | Ichihara et al. | |
| 2005/0236623 A1 | 10/2005 | Takechi et al. | |
| 2005/0275539 A1 | 12/2005 | Sakama et al. | |
| 2006/0001138 A1 | 1/2006 | Sakama et al. | |
| 2006/0032926 A1 | 2/2006 | Baba et al. | |
| 2006/0044192 A1 | 3/2006 | Egbert | |
| 2006/0055601 A1 | 3/2006 | Kameda et al. | |
| 2006/0071084 A1 | 4/2006 | Detig et al. | |
| 2006/0109185 A1 | 5/2006 | Iwai et al. | |
| 2006/0145872 A1 | 7/2006 | Tanaka et al. | |
| 2006/0158380 A1 | 7/2006 | Son et al. | |
| 2006/0170606 A1 | 8/2006 | Yamagajo et al. | |
| 2006/0214801 A1 | 9/2006 | Murofushi et al. | |
| 2006/0220871 A1 | 10/2006 | Baba et al. | |
| 2006/0244676 A1 | 11/2006 | Uesaka | |
| 2006/0267138 A1 | 11/2006 | Kobayashi | |
| 2007/0004028 A1 | 1/2007 | Lair et al. | |
| 2007/0018893 A1 | 1/2007 | Kai et al. | |
| 2007/0040028 A1 | 2/2007 | Kawamata | |
| 2007/0052613 A1 | 3/2007 | Gallschuetz et al. | |
| 2007/0057854 A1 | 3/2007 | Oodachi et al. | |
| 2007/0069037 A1 | 3/2007 | Kawai | |
| 2007/0132591 A1 | 6/2007 | Khatri | |
| 2007/0158438 A1 * | 7/2007 | Fukuda et al. | 235/492 |
| 2007/0164414 A1 | 7/2007 | Dokai et al. | |
| 2007/0200782 A1 | 8/2007 | Hayama et al. | |
| 2007/0229276 A1 | 10/2007 | Yamagajo et al. | |
| 2007/0247387 A1 | 10/2007 | Kubo et al. | |
| 2007/0252700 A1 | 11/2007 | Ishihara et al. | |
| 2007/0252703 A1 | 11/2007 | Kato et al. | |
| 2007/0285335 A1 | 12/2007 | Bungo et al. | |
| 2007/0290928 A1 | 12/2007 | Chang et al. | |
| 2008/0024156 A1 | 1/2008 | Arai et al. | |
| 2008/0070003 A1 | 3/2008 | Nakatani et al. | |
| 2008/0087990 A1 | 4/2008 | Kato et al. | |
| 2008/0143630 A1 | 6/2008 | Kato et al. | |
| 2008/0150693 A1 * | 6/2008 | You et al. | 340/10.1 |
| 2008/0169905 A1 | 7/2008 | Slatter | |
| 2008/0224826 A1 * | 9/2008 | Kuwako et al. | 340/10.1 |
| 2008/0272885 A1 | 11/2008 | Atherton | |
| 2009/0002130 A1 | 1/2009 | Kato | |
| 2009/0009007 A1 | 1/2009 | Kato et al. | |
| 2009/0021352 A1 | 1/2009 | Kataya et al. | |
| 2009/0021446 A1 | 1/2009 | Kataya et al. | |
| 2009/0065594 A1 | 3/2009 | Kato et al. | |
| 2009/0079573 A1 * | 3/2009 | Jiang et al. | 340/572.7 |
| 2009/0109102 A1 | 4/2009 | Dokai et al. | |
| 2009/0160719 A1 | 6/2009 | Kato et al. | |
| 2009/0201116 A1 | 8/2009 | Orihara | |
| 2009/0224061 A1 | 9/2009 | Kato et al. | |
| 2009/0231106 A1 | 9/2009 | Okamura | |
| 2009/0262041 A1 | 10/2009 | Ikemoto et al. | |
| 2009/0266900 A1 | 10/2009 | Ikemoto et al. | |
| 2009/0278687 A1 | 11/2009 | Kato | |
| 2009/0321527 A1 | 12/2009 | Kato et al. | |
| 2010/0103058 A1 | 4/2010 | Kato et al. | |
| 2011/0031320 A1 | 2/2011 | Kato et al. | |
| 2011/0063184 A1 * | 3/2011 | Furumura et al. | 343/856 |

FOREIGN PATENT DOCUMENTS

| | | |
|---|---|---|
| EP | 0 694 874 A2 | 1/1996 |
| EP | 0 848 448 A2 | 6/1998 |
| EP | 0 923 153 A1 | 6/1999 |
| EP | 0 948 083 A2 | 10/1999 |
| EP | 0 977 145 A2 | 2/2000 |

(56) References Cited

FOREIGN PATENT DOCUMENTS

| | | |
|---|---|---|
| EP | 1 010 543 A1 | 6/2000 |
| EP | 1 160 915 A2 | 12/2001 |
| EP | 1 170 795 A2 | 1/2002 |
| EP | 1 193 793 A2 | 4/2002 |
| EP | 1 227 540 A1 | 7/2002 |
| EP | 1 280 232 A1 | 1/2003 |
| EP | 1 280 350 A1 | 1/2003 |
| EP | 1 343 223 A1 | 9/2003 |
| EP | 1 357 511 A2 | 10/2003 |
| EP | 1 547 753 A1 | 6/2005 |
| EP | 1 548 872 A1 | 6/2005 |
| EP | 1 703 589 A1 | 9/2006 |
| EP | 1 744 398 A1 | 1/2007 |
| EP | 1 841 005 A1 | 10/2007 |
| EP | 1 865 574 A1 | 12/2007 |
| EP | 1 976 056 A1 | 10/2008 |
| EP | 1 988 491 A1 | 11/2008 |
| EP | 1 993 170 A1 | 11/2008 |
| EP | 2 009 738 A1 | 12/2008 |
| EP | 2 012 258 A1 | 1/2009 |
| EP | 2 096 709 A1 | 9/2009 |
| EP | 2 148 449 A1 | 1/2010 |
| EP | 2 251 934 A1 | 11/2010 |
| GB | 2 305 075 A | 3/1997 |
| GB | 2461443 A | 1/2010 |
| JP | 50-143451 A | 11/1975 |
| JP | 61-284102 A | 12/1986 |
| JP | 62-127140 U | 8/1987 |
| JP | 02-164105 A | 6/1990 |
| JP | 02-256208 A | 10/1990 |
| JP | 03-503467 A | 8/1991 |
| JP | 03-262313 A | 11/1991 |
| JP | 04-150011 A | 5/1992 |
| JP | 04-167500 A | 6/1992 |
| JP | 04-096814 U | 8/1992 |
| JP | 04-101168 U | 9/1992 |
| JP | 04-134807 U | 12/1992 |
| JP | 05-327331 A | 12/1993 |
| JP | 6-53733 A | 2/1994 |
| JP | 06-077729 A | 3/1994 |
| JP | 06-177635 A | 6/1994 |
| JP | 6-260949 A | 9/1994 |
| JP | 07-183836 A | 7/1995 |
| JP | 08-055725 A | 2/1996 |
| JP | 08-056113 A | 2/1996 |
| JP | 08-088586 A | 4/1996 |
| JP | 08-88586 A | 4/1996 |
| JP | 8-87580 A | 6/1996 |
| JP | 11-149537 A | 6/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 9-93029 A | 4/1997 |
| JP | 09-093029 A | 4/1997 |
| JP | 09-245381 A | 9/1997 |
| JP | 09-252217 A | 9/1997 |
| JP | 09-270623 A | 10/1997 |
| JP | 09-284038 A | 10/1997 |
| JP | 9-512367 A | 12/1997 |
| JP | 10-69533 A | 3/1998 |
| JP | 10-069533 A | 3/1998 |
| JP | 10-505466 A | 5/1998 |
| JP | 10-171954 A | 6/1998 |
| JP | 10-173427 A | 6/1998 |
| JP | 10-193849 A | 7/1998 |
| JP | 10-193851 A | 7/1998 |
| JP | 10-293828 A | 11/1998 |
| JP | 11-025244 A | 1/1999 |
| JP | 11-039441 A | 2/1999 |
| JP | 11-075329 A | 3/1999 |
| JP | 11-085937 A | 3/1999 |
| JP | 11-88241 A | 3/1999 |
| JP | 11-102424 A | 4/1999 |
| JP | 11-103209 A | 4/1999 |
| JP | 11-149536 A | 6/1999 |
| JP | 11-149538 A | 6/1999 |
| JP | 11-219420 A | 8/1999 |
| JP | 11-220319 A | 8/1999 |
| JP | 11-282993 A | 10/1999 |
| JP | 11-328352 A | 11/1999 |
| JP | 11-331014 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2005-229474 A | 1/2000 |
| JP | 2000-059260 A | 2/2000 |
| JP | 2000-085283 A | 3/2000 |
| JP | 2000-090207 A | 3/2000 |
| JP | 2000-132643 A | 5/2000 |
| JP | 2000-137778 A | 5/2000 |
| JP | 2000-137779 A | 5/2000 |
| JP | 2000-137785 A | 5/2000 |
| JP | 2000-148948 A | 5/2000 |
| JP | 2000-172812 A | 6/2000 |
| JP | 2000-198334 A | 7/2000 |
| JP | 2000-209013 A | 7/2000 |
| JP | 2000-222540 A | 8/2000 |
| JP | 2000-510271 A | 8/2000 |
| JP | 2000-242754 A | 9/2000 |
| JP | 2000-243797 A | 9/2000 |
| JP | 2000-251049 A | 9/2000 |
| JP | 2000-261230 A | 9/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 3075400 U | 11/2000 |
| JP | 2000-349680 A | 12/2000 |
| JP | 2001-10264 A | 1/2001 |
| JP | 2001-028036 A | 1/2001 |
| JP | 2007-18067 A | 1/2001 |
| JP | 2001-043340 A | 2/2001 |
| JP | 2001-66990 A | 3/2001 |
| JP | 2001-76111 A | 3/2001 |
| JP | 2001-101369 A | 4/2001 |
| JP | 2001-505682 A | 4/2001 |
| JP | 2001-168628 A | 6/2001 |
| JP | 2001-188890 A | 7/2001 |
| JP | 2001-240046 A | 9/2001 |
| JP | 2001-256457 A | 9/2001 |
| JP | 2001-257292 A | 9/2001 |
| JP | 2001-514777 A | 9/2001 |
| JP | 2001-319380 A | 11/2001 |
| JP | 2001-331976 A | 11/2001 |
| JP | 2001-332923 A | 11/2001 |
| JP | 2001-339226 A | 12/2001 |
| JP | 2001-344574 A | 12/2001 |
| JP | 2001-351083 A | 12/2001 |
| JP | 2001-351084 A | 12/2001 |
| JP | 2001-352176 A | 12/2001 |
| JP | 2002-024776 A | 1/2002 |
| JP | 2002-026513 A | 1/2002 |
| JP | 2002-32731 A | 1/2002 |
| JP | 2002-042076 A | 2/2002 |
| JP | 2002-063557 A | 2/2002 |
| JP | 2002-505645 A | 2/2002 |
| JP | 2002-076750 A | 3/2002 |
| JP | 2002-76750 A | 3/2002 |
| JP | 2002-111363 A | 4/2002 |
| JP | 2002-150245 A | 5/2002 |
| JP | 2002-157564 A | 5/2002 |
| JP | 2002-158529 A | 5/2002 |
| JP | 2002-175508 A | 6/2002 |
| JP | 2002-183690 A | 6/2002 |
| JP | 2002-185358 A | 6/2002 |
| JP | 2002183676 A * | 6/2002 |
| JP | 2002-204117 A | 7/2002 |

(56) References Cited

FOREIGN PATENT DOCUMENTS

| | | |
|---|---|---|
| JP | 2002-522849 A | 7/2002 |
| JP | 2002-230128 A | 8/2002 |
| JP | 2002-232221 A | 8/2002 |
| JP | 2002-252117 A | 9/2002 |
| JP | 2002-259934 A | 9/2002 |
| JP | 2002-280821 A | 9/2002 |
| JP | 2002-298109 A | 10/2002 |
| JP | 2002-308437 A | 10/2002 |
| JP | 2002-319008 A | 10/2002 |
| JP | 2002-319009 A | 10/2002 |
| JP | 2002-319812 A | 10/2002 |
| JP | 2002-362613 A | 12/2002 |
| JP | 2002-366917 A | 12/2002 |
| JP | 2002-373029 A | 12/2002 |
| JP | 2002-373323 A | 12/2002 |
| JP | 2002-374139 A | 12/2002 |
| JP | 2003-006599 A | 1/2003 |
| JP | 2003-016412 A | 1/2003 |
| JP | 2003-022912 A | 1/2003 |
| JP | 2003-026177 A | 1/2003 |
| JP | 2003-030612 A | 1/2003 |
| JP | 2003-44789 A | 2/2003 |
| JP | 2003-046318 A | 2/2003 |
| JP | 2003-58840 A | 2/2003 |
| JP | 2003-067711 A | 3/2003 |
| JP | 2003-069335 A | 3/2003 |
| JP | 2003-076947 A | 3/2003 |
| JP | 2003-76963 A | 3/2003 |
| JP | 2003-78333 A | 3/2003 |
| JP | 2003-078336 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-155062 A | 5/2003 |
| JP | 2003-158414 A | 5/2003 |
| JP | 2003-168760 A | 6/2003 |
| JP | 2003-179565 A | 6/2003 |
| JP | 2003-187207 A | 7/2003 |
| JP | 2003-187211 A | 7/2003 |
| JP | 2003-188338 A | 7/2003 |
| JP | 2003-188620 A | 7/2003 |
| JP | 2003-198230 A | 7/2003 |
| JP | 2003-209421 A | 7/2003 |
| JP | 2003-218624 A | 7/2003 |
| JP | 20036-216919 A | 7/2003 |
| JP | 2003-233780 A | 8/2003 |
| JP | 2003-242471 A | 8/2003 |
| JP | 2003-243918 A | 8/2003 |
| JP | 2003-249813 A | 9/2003 |
| JP | 2003-529163 A | 9/2003 |
| JP | 2003-288560 A | 10/2003 |
| JP | 2003-309418 A | 10/2003 |
| JP | 2003-317060 A | 11/2003 |
| JP | 2003-331246 A | 11/2003 |
| JP | 2003-332820 A | 11/2003 |
| JP | 2003-536302 A | 12/2003 |
| JP | 2004-040597 A | 2/2004 |
| JP | 2004-505481 A | 2/2004 |
| JP | 2004-082775 A | 3/2004 |
| JP | 2004-88218 A | 3/2004 |
| JP | 2004-93693 A | 3/2004 |
| JP | 2004-096566 A | 3/2004 |
| JP | 2004-126750 A | 4/2004 |
| JP | 2004-127230 A | 4/2004 |
| JP | 2004-140513 A | 5/2004 |
| JP | 2004-213582 A | 7/2004 |
| JP | 2004-519916 A | 7/2004 |
| JP | 2004-234595 A | 8/2004 |
| JP | 2004-253858 A | 9/2004 |
| JP | 2004-527864 A | 9/2004 |
| JP | 2004-280390 A | 10/2004 |
| JP | 2004-282403 A | 10/2004 |
| JP | 2004-287767 A | 10/2004 |
| JP | 2004-297249 A | 10/2004 |
| JP | 2004-297681 A | 10/2004 |
| JP | 2004-304370 A | 10/2004 |
| JP | 2004-319848 A | 11/2004 |
| JP | 2004-326380 A | 11/2004 |
| JP | 2004-334268 A | 11/2004 |
| JP | 2004-336250 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-5866 A | 1/2005 |
| JP | 2005-18156 A | 1/2005 |
| JP | 2005-033461 A | 2/2005 |
| JP | 2005-092699 A | 4/2005 |
| JP | 2005-124061 A | 5/2005 |
| JP | 2005-128592 A | 5/2005 |
| JP | 2005-129019 A | 5/2005 |
| JP | 2005-135132 A | 5/2005 |
| JP | 2005-136528 A | 5/2005 |
| JP | 2005-137032 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |
| JP | 2005-191705 A | 7/2005 |
| JP | 2005-192124 A | 7/2005 |
| JP | 2005-210676 A | 8/2005 |
| JP | 2005-210680 A | 8/2005 |
| JP | 2005-217822 A | 8/2005 |
| JP | 2005-236339 A | 9/2005 |
| JP | 2005-244778 A | 9/2005 |
| JP | 2005-252853 A | 9/2005 |
| JP | 2005-275870 A | 10/2005 |
| JP | 2005-284352 A | 10/2005 |
| JP | 2005-293537 A | 10/2005 |
| JP | 2005-295135 A | 10/2005 |
| JP | 2005-311205 A | 11/2005 |
| JP | 2005-321305 A | 11/2005 |
| JP | 2005-322119 A | 11/2005 |
| JP | 2005-335755 A | 12/2005 |
| JP | 2005-340759 A | 12/2005 |
| JP | 2005-345802 A | 12/2005 |
| JP | 2005-346820 A | 12/2005 |
| JP | 2005-352858 A | 12/2005 |
| JP | 2006-013976 A | 1/2006 |
| JP | 2006-13976 A | 1/2006 |
| JP | 2006-025390 A | 1/2006 |
| JP | 2006-031766 A | 2/2006 |
| JP | 2006-033312 A | 2/2006 |
| JP | 2006-39902 A | 2/2006 |
| JP | 2006-039947 A | 2/2006 |
| JP | 2006-42059 A | 2/2006 |
| JP | 2006-42097 A | 2/2006 |
| JP | 2006-053833 A | 2/2006 |
| JP | 2006-67479 A | 3/2006 |
| JP | 2006-72706 A | 3/2006 |
| JP | 2006-074348 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148462 A | 6/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-270212 A | 10/2006 |

(56) References Cited

FOREIGN PATENT DOCUMENTS

| | | |
|---|---|---|
| JP | 2006-270681 A | 10/2006 |
| JP | 2006-270766 A | 10/2006 |
| JP | 2006-285911 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2006-339964 A | 12/2006 |
| JP | 2007-007888 A | 1/2007 |
| JP | 2007-13120 A | 1/2007 |
| JP | 2007-28002 A | 2/2007 |
| JP | 2007-043535 A | 2/2007 |
| JP | 2007-048126 A | 2/2007 |
| JP | 2007-65822 A | 3/2007 |
| JP | 2007-79687 A | 3/2007 |
| JP | 2007-81712 A | 3/2007 |
| JP | 2007-096768 A | 4/2007 |
| JP | 2007-102348 A | 4/2007 |
| JP | 2007-116347 A | 5/2007 |
| JP | 2007-122542 A | 5/2007 |
| JP | 2007-150642 A | 6/2007 |
| JP | 2007-150868 A | 6/2007 |
| JP | 2007-159083 A | 6/2007 |
| JP | 2007-159129 A | 6/2007 |
| JP | 2007-166133 A | 6/2007 |
| JP | 2007-166379 A | 6/2007 |
| JP | 2007-172369 A | 7/2007 |
| JP | 2007-172527 A | 7/2007 |
| JP | 2007-228325 A | 9/2007 |
| JP | 2007-266999 A | 10/2007 |
| JP | 2007-272264 A | 10/2007 |
| JP | 2007-287128 A | 11/2007 |
| JP | 2007-295557 A | 11/2007 |
| JP | 2007-312350 A | 11/2007 |
| JP | 2007-324865 A | 12/2007 |
| JP | 2008-033716 A | 2/2008 |
| JP | 2008-72243 A | 3/2008 |
| JP | 2008-083867 A | 4/2008 |
| JP | 2008-097426 A | 4/2008 |
| JP | 4069958 B2 | 4/2008 |
| JP | 2008-103691 A | 5/2008 |
| JP | 2008-107947 A | 5/2008 |
| JP | 2008-148345 A | 6/2008 |
| JP | 2008-519347 A | 6/2008 |
| JP | 2008-160874 A | 7/2008 |
| JP | 2008-197714 A | 8/2008 |
| JP | 2008-217406 A | 9/2008 |
| JP | 2008-288915 A | 11/2008 |
| JP | 11-175678 A | 1/2009 |
| JP | 2009-015574 A | 1/2009 |
| JP | 2009-017284 A | 1/2009 |
| JP | 2009-25870 A | 2/2009 |
| JP | 2009-27291 A | 2/2009 |
| JP | 2009-044715 A | 2/2009 |
| JP | 3148168 U | 2/2009 |
| JP | 2009-182630 A | 8/2009 |
| JP | 2010-009196 A | 1/2010 |
| JP | 4609604 B2 | 1/2011 |
| KR | 10-2009-0020885 A | 2/2009 |
| NL | 9100176 A | 3/1992 |
| NL | 9100347 A | 3/1992 |
| WO | 98/33142 A1 | 7/1998 |
| WO | 99/67754 A1 | 12/1999 |
| WO | 00/10122 A2 | 2/2000 |
| WO | 01/95242 A2 | 12/2001 |
| WO | 02/48980 A1 | 6/2002 |
| WO | 02/061675 A1 | 8/2002 |
| WO | 02/097723 A1 | 12/2002 |
| WO | 03/079305 A1 | 9/2003 |
| WO | 2004/036772 A1 | 4/2004 |
| WO | 2004/070879 A | 8/2004 |
| WO | 2004/072892 A1 | 8/2004 |
| WO | 2005/073937 A | 8/2005 |
| WO | 2005/091434 A1 | 9/2005 |
| WO | 2005/115849 A1 | 12/2005 |
| WO | 2006/045682 A | 5/2006 |
| WO | 2006/048663 A1 | 5/2006 |
| WO | 2006/114821 A1 | 11/2006 |
| WO | 2007/083574 A1 | 7/2007 |
| WO | 2007/083575 A1 | 7/2007 |
| WO | 2007/086130 A1 | 8/2007 |
| WO | 2007/097385 A1 | 8/2007 |
| WO | 2007/102360 A1 | 9/2007 |
| WO | 2007/105348 A1 | 9/2007 |
| WO | 2007/119310 A1 | 10/2007 |
| WO | 2007/125683 A1 | 11/2007 |
| WO | 2007/138857 A1 | 12/2007 |
| WO | 2008/007606 A | 1/2008 |
| WO | 2008/081699 A1 | 7/2008 |
| WO | WO 2008081699 A1 * | 7/2008 |
| WO | 2008/126458 A1 | 10/2008 |
| WO | 2008/133018 A1 | 11/2008 |
| WO | 2008/140037 A1 | 11/2008 |
| WO | 2008/142957 A1 | 11/2008 |
| WO | 2009/011144 A1 | 1/2009 |
| WO | 2009/011376 A1 | 1/2009 |
| WO | 2009/011400 A1 | 1/2009 |
| WO | 2009/011423 A1 | 1/2009 |
| WO | 2009/081719 A1 | 7/2009 |
| WO | 2009/110381 A1 | 9/2009 |

OTHER PUBLICATIONS

Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PC/JP2009/053693, mailed on Jun. 9, 2009. X.
Kato: "Composite Antenna," U.S. Appl. No. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 12/861,945; filed Aug. 24, 2010.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device" U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.

(56) References Cited

OTHER PUBLICATIONS

Official Communication issued in corresponding Japanese Application No. 2010-501323, mailed on Apr. 6, 2010.
Kato et al.: "Component of Wireless Ic Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454, filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.
Official Communication issued in International Patent Application No. PCT/JP2009/069486, mailed on Mar. 2, 2010.
Kato: "Radio Ic Device"; U.S. Appl. No. 13/080,775, filed Apr. 6, 2011.
Kato et al.: "Antenna and Wireless Ic Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFID by Roll-To-Roll Process", Material Stage, Technical Information Institute Co., Ltd, vol. 7, No. 9, 2007, pp. 4-12.
Dokai et al.: "Wireless Ic Device"; U.S. Appl. No. 13/088,480, filed Apr. 18, 2011.
Kato et al.: "High-Frequency Device and Wireless IC Device"; U.S. Appl. No. 13/094,928, filed Apr. 27, 2011.
Dokai et al.: "Wireless IC Devide"; U.S. Appl. No. 13/099,392, filed May 3, 2011.
Kato et al.: "Radio Frequency IC Device"; U.S. Appl. No. 13/163,803, filed Jun. 20, 2011.
Official Communication issued in International Patent Application No. PCT/JP2010/050170, mailed on Apr. 13, 2010.
Official Communication issued in International Patent Application No. PCT/JP2010/051205, mailed on May 11, 2010.
Kato: "Wireless IC Device, Wireless IC Module and Method of Manufacturing Wireless IC Module"; U.S. Appl. No. 13/169,067, filed Jun. 27, 2011.
Kato et al.: "Antenna and Wireless IC Device"; U.S. Appl. No. 13/190,670, filed Jul. 26, 2011.
Shiroki et al.: "RFIC Chip Mounting Structure"; U.S. Appl. No. 13/223,429, filed Sep. 1, 2011.
Official Communication issued in International Patent Application No. PCT/JP2010/056559, mailed on Jul. 27, 2010.
Taniguchi et al.: "Antenna Device and Radio Frequency IC Device"; U.S. Appl. No. 13/232,102, filed Sep. 14, 2011.
Official Communication issued in corresponding Japanese Patent Application No. 2011-539361, mailed on Feb. 19, 2013.
Official Communication issued in corresponding European Patent Application No. 10828262.5, mailed on Aug. 2, 2013.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material With Electromagnetic Coupling Module," U.S. Appl. No. 13/536,663, filed Aug. 6, 2009.
Osamura et al.: "Packaging Material With Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Official communication issued in International Application No. PCT/JP2008/058614, mailed on Jun. 10, 2008.
Official communication issued in counterpart International Application No. PCT/JP2008/071502, mailed Feb. 24, 2009.
Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless Ic Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.: "Wireless IC Device and Electronic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
Official Communication issued in International Patent Application No. PCT/JP2009/066336, mailed on Dec. 22, 2009.
Official Communication issued in corresponding Japanese Patent Application No. 2010-509439, mailed on Jul. 6, 2010.
Official Communication issued in corresponding Japanese Patent Application No. 2011-032311, mailed on Mar. 29, 2011.
Official Communication issued in corresponding Japanese Patent Application No. 2009-525327, drafted on Sep. 22, 2010.
Official Communication issued in corresponding Japanese Patent Application No. 2011-032311, mailed on Aug. 2, 2011.
Official Communication issued in corresponding Japanese Patent Application No. 2011-032312, mailed on Aug. 2, 2011.
Official Communication issued in corresponding Japanese Patent Application No. 2011-032311, mailed on Aug. 23, 2011.
Kato et al.: "Wireless IC Device Component and Wireless IC Device"; U.S. Appl. No. 13/241,823, filed Sep. 23, 2011.
Kato et al.: "Antenna Device and Method of Setting Resonant Frequency of Antenna Device"; U.S. Appl. No. 13/272,365, filed Oct. 13, 2011.
Official Communication issued in International Patent Application No. PCT/JP2010/057668, mailed on Aug. 17, 2010.
Dokai et al.: "Optical Disc"; U.S. Appl. No. 13/295,153, filed Nov. 14, 2011.
Osamura et al.: "Radio Frequency IC Device and Method of Manufacturing the Same"; U.S. Appl. No. 13/308,575, filed Dec. 1, 2011.
Official Communication issued in International Patent Application No. PCT/JP2010/069417, mailed on Dec. 7, 2010.

(56) References Cited

OTHER PUBLICATIONS

Kato: "Wireless IC Device and Coupling Method for Power Feeding Circuit and Radiation Plate"; U.S. Appl. No. 13/325,273, filed Dec. 14, 2011.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless Ic Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency Ic Device"; Attorney Docket No. 36856.1748; U.S. Application No. 12/336,629; filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651; filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 13/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.

\* cited by examiner

WIRELESS IC TAG, READER-WRITER, AND INFORMATION PROCESSING SYSTEM

BACKGROUND OF THE INVENTION

1. Field of the Invention

The present invention relates to wireless integrated circuit (IC) tags. More particularly, the present invention relates to a wireless IC tag used in a Radio Frequency Identification (RFID) system, a reader-writer communicating with the wireless IC tag, and an information processing system including the wireless IC tag.

2. Description of the Related Art

Hitherto, Radio Frequency Identification (RFID) systems have been developed as article management systems. In such an RFID system, a reader-writer producing an induction electromagnetic field communicates with a wireless tag in a non-contact manner to transmit information. The wireless tag is attached to an article and stores certain information. A wireless IC tag including two coil-shaped antennas is described in Japanese Unexamined Patent Application Publication No. 2004-126750 as a wireless tag used in an RFID system. The two coil-shaped antennas are connected in series to each other so as to form a figure eight.

However, since the two coil-shaped antennas have opposite winding directions in the wireless IC tag, the wireless IC tag has a disadvantage in that, in response to reception of a high-frequency magnetic field radiated from a loop antenna of the reader-writer, a current occurring in one coil-shaped antenna is offset by a current occurring in the other coil-shaped antenna. Accordingly, there is a problem in that the energy transfer efficiency between the wireless IC tag and the reader-writer is reduced to decrease the communication distance.

SUMMARY OF THE INVENTION

To overcome the problems described above, preferred embodiments of the present invention provide a wireless IC tag, a reader-writer, and an information processing system capable of improving the energy transfer efficiency so as to increase the communication distance.

A wireless IC tag according to a first preferred embodiment of the present invention preferably includes a wireless IC chip and at least two coil-shaped antennas. One end of each of the at least two coil-shaped antennas is electrically connected to the wireless IC chip, and the other ends of the at least two coil-shaped antennas are electrically connected to each other. Preferably, the winding axes of the at least two coil-shaped antennas are arranged at different positions, and the at least two coil-shaped antennas have the same winding direction.

A reader-writer according to a second preferred embodiment of the present invention preferably includes an antenna and an information processing portion. The antenna preferably includes a first coil-shaped antenna portion and a second coil-shaped antenna portion. One end of each of the first and second coil-shaped antenna portions is electrically connected to the information processing portion, and the other ends of the first and second coil-shaped antenna portions are electrically connected to each other. Preferably, the winding axes of the first and second coil-shaped antenna portions are arranged at different positions, and the first and second coil-shaped antenna portions have the same winding direction.

An information processing system according to a third preferred embodiment of the present invention preferably includes the wireless IC tag according to the first preferred embodiment and a reader-writer. The reader-writer is arranged to process information on the wireless IC tag.

The information processing system according to the third preferred embodiment may preferably include the reader-writer according to the second preferred embodiment.

In the wireless IC tag, the reader-writer, and the information processing system according to preferred embodiments of the present invention, the multiple coil-shaped antennas (coil-shaped antenna portions) transmit and receive high-frequency signals (for example, within the ultra high frequency (UHF) band or the high frequency (HF) band) at a relatively short distance. The winding axes of the multiple coil-shaped antennas (coil-shaped antenna portions) are arranged at different positions and the multiple coil-shaped antennas (coil-shaped antenna portions) have the same winding direction. Accordingly, the energy transfer efficiency is improved without an offset of currents occurring in the respective antennas (antenna portions).

According to various preferred embodiments of the present invention, it is possible to improve the energy transfer efficiency between the antenna of the reader-writer and the antennas of the wireless IC tag so as to increase the communication distance.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 11A and 11B include diagrams of the information processing system shown in FIG. 10 wherein FIG. 11A is a perspective view of an antenna at a reader-writer side and FIG. 11B is a block diagram of a circuit.

DETAILED DESCRIPTION OF THE PREFERRED EMBODIMENTS

Preferred embodiments of a wireless IC tag, a reader-writer, and an information processing system according to the present invention will be described herein with reference to the attached drawings.

First Preferred Embodiment

Figure 1:
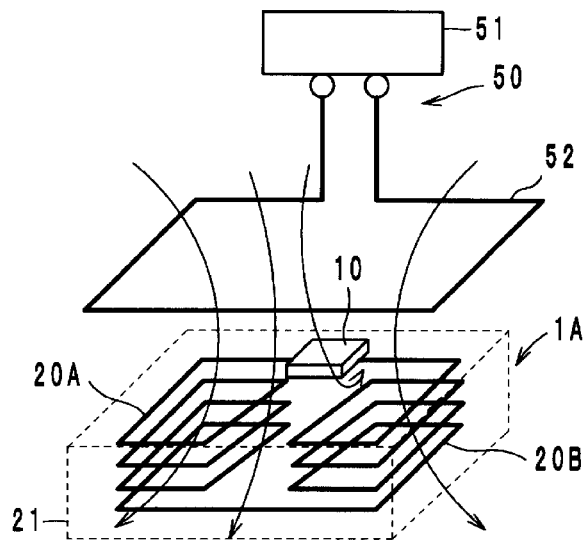
FIG. 1 is a perspective view showing an information processing system including a wireless IC tag according to a first preferred embodiment of the present invention.

A wireless IC tag 1A according to a first preferred embodiment of the present invention preferably includes a wireless IC chip 10 that processes transmission and reception signals having certain frequencies and two coil-shaped antennas 20A and 20B, as shown in FIG. 1.

The wireless IC chip 10 preferably includes a clock circuit, a logic circuit, a memory circuit, and other suitable circuit elements and necessary information is stored in the wireless IC chip 10. A pair of input-output terminal electrodes (not shown) is provided on the rear surface of the wireless IC chip 10.

Each of the coil-shaped antennas 20A and 20B preferably includes conductors that are wound in a coil shape. One end of the coil-shaped antenna 20A and one end of the coil-shaped antenna 20B are electrically connected to the input-output terminal electrodes on the wireless IC chip 10. The other end of the coil-shaped antenna 20A is electrically connected to the other end of the coil-shaped antenna 20B. The winding axes of the antennas 20A and 20B are preferably arranged at different positions in a plan view, and the winding direction of the antenna 20A is preferably the same as that of the antenna 20B so that the direction of the magnetic field caused by a current flowing through the antenna 20A at a certain moment is the same as that of the magnetic field caused by a current flowing through the antenna 20B at the certain moment. Each of the antennas 20A and 20B preferably includes multiple coil conductors that are stacked in a substrate 21, as described below with reference to FIG. 3. The wireless IC chip 10 is mounted on the substrate 21.

The wireless IC tag 1A is capable of communicating with a reader-writer 50, and the wireless IC tag 1A and the reader-writer 50 define an information processing system. The reader-writer 50 includes a common information processing circuit 51 and an antenna 52. The antenna 52 is a loop-shaped magnetic field antenna having an area substantially equal to the area resulting from the sum of the area of the antenna 20A of the wireless IC tag 1A and the area of the antenna 20B thereof.

In this information processing system, proximity of the antenna 52 of the reader-writer 50 to the wireless IC tag 1A causes a magnetic flux based on a signal of a certain frequency radiated from the antenna 52 to pass through the antennas 20A and 20B. As a result, a current flows through the antennas 20A and 20B. In other words, the antenna 52 is electromagnetically coupled to the antennas 20A and 20B. This current is supplied to the wireless IC chip 10 to operate the wireless IC chip 10. In contrast, a response signal from the wireless IC chip 10 is radiated from the coil-shaped antennas 20A and 20B to the antenna 52 and is read by the information processing circuit 51 of the reader-writer 50.

Since the winding direction of the coil-shaped antenna 20A is preferably the same as that of the coil-shaped antenna 20B, the energy transfer efficiency is improved without offsetting the currents occurring in the respective antennas 20A and 20B. In other words, the communication distance between the antenna 52 and the antennas 20A and 20B is increased. In addition, configuring the antennas 20A and 20B so as to have a layered structure and arranging the coil conductors so that the coil conductors are overlaid on one another in a plan view enables the open space of the coil to be increased, thus increasing the amount of intersecting magnetic flux. As a result, the communication distance is further increased.

The compact loop-shaped antenna is used as the antenna of the reader-writer 50 and the communication with the wireless IC tag 1A is primarily through the magnetic field in the first preferred embodiment. Since the attenuation in the distance of the magnetic field is greater than that of the electric field, the communication is established in a relatively close state. Accordingly, it is possible to limit the communication with only the wireless IC tags that are targets to be read in the reader-writer 50 and there is no possibility of erroneous communication with peripheral wireless IC tags that are not targets to be read.

The imaginary portion of the impedance of the wireless IC chip 10 preferably has a conjugate relationship with the imaginary portions of the impedances of the coil-shaped antennas 20A and 20B at the frequencies of signals used for communication. In other words, the resonant frequencies of the antennas 20A and 20B are preferably near a usable frequency. It is further preferable that the real portion of the impedance of the wireless IC chip 10 coincides with the real portions of the impedances of the coil-shaped antennas 20A and 20B.

In particular, the coil-shaped antennas 20A and 20B having a layered configuration and that each have a larger opening enable a higher inductance value to be achieved even with a small size and, thus, the wireless IC tag 1A itself is reduced in size. Setting the usable frequency to a shorter wavelength of around 950 MHz, for example, enables the wireless IC tag 1A to be further reduced in size. When the frequencies within the UHF band are used, the wireless IC tag 1A can preferably have a compact size of, for example, about 3.2 mm long, about 1.6 mm wide, and about 0.5 mm high.

The wireless IC tag 1A may be mounted on an article using double-sided tape or adhesive or may be attached to an article with a seal, a label, a tape, and other suitable material. In this case, any side of the wireless IC chip 10 and any side of the antennas 20A and 20B may be directed towards the surface of the article.

Figure 2:
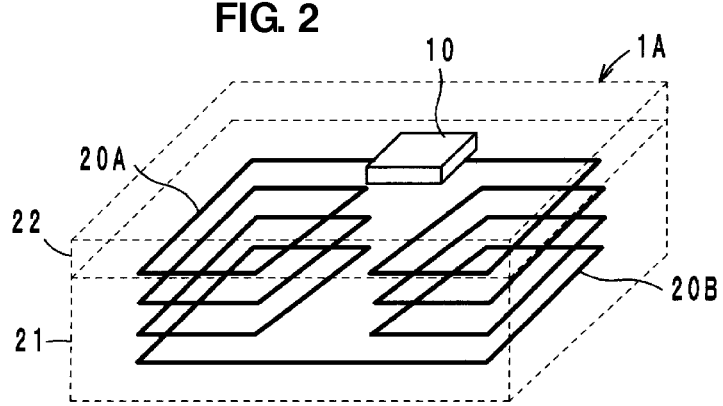
FIG. 2 is a perspective view showing the wireless IC tag shown in FIG. 1.

In addition, as shown in FIG. 2, a sealing member 22 preferably made of resin or ceramic, for example, may be provided on the substrate 21 to seal the wireless IC chip 10 with the sealing member 22. The sealing member 22 may preferably be made of the same material as that of the substrate 21 described below. The sealing member 22 can be used to protect the wireless IC chip 10. The sealing member 22 having a flat surface can be used to facilitate the attachment to an article.

Figure 3:
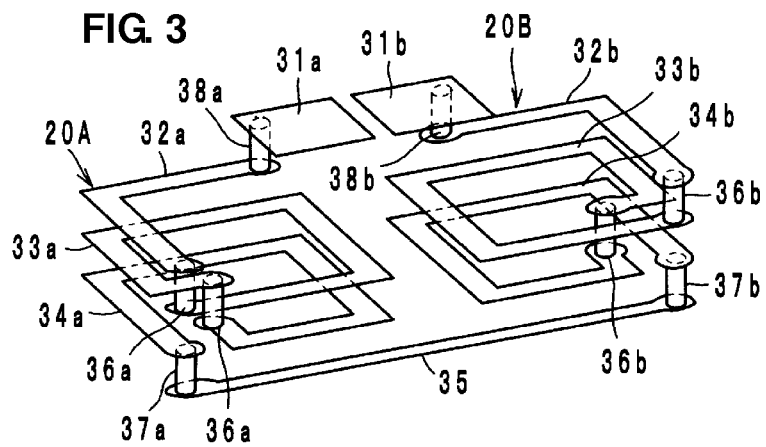
FIG. 3 is a perspective view showing a layered structure of coil-shaped antennas of the wireless IC tag shown in FIG. 2.

An example of the layered structure of the coil-shaped antennas 20A and 20B will now be described with reference to FIG. 3. The substrate 21 is manufactured by stacking multiple sheets on which electrode, conductors, and via-hole conductors are provided. Electrodes 31a and 31b to be connected to the input-output terminal electrodes of the wireless IC chip 10 are provided on a first layer. Coil conductors 32a, 32b, 33a, 33b, 34a, and 34b are provided on second to fourth layers. A connection coil conductor 35 is provided on a fifth layer. The coil conductors 32a, 33a, and 34a are connected to each other in a coil shape via a via-hole conductor 36a to define the antenna 20A, and the coil conductors 32b, 33b, and 34b are connected to each other in a coil shape via a via-hole conductor 36b to define the antenna 20B. The other ends of the coil conductors 32a, 33a, and 34a and the coil conductors 32b, 33b, and 34b are connected to both ends of the connection coil conductor 35 via via-hole conductor 37a and 37b, respectively. One end of the antenna 20A is connected to the electrode 31a via a via-hole conductor 38a, and one end of the antenna 20B is connected to the electrode 31b via a via-hole conductor 38b.

Although each sheet of the substrate 21 may be made of a common resin having a relative permittivity of about three to about four, for example, each sheet of the substrate 21 is preferably made of a material having a higher permittivity, for example, ceramic having a relative permittivity of at least about seven.

The coil-shaped antennas 20A and 20B may have a layered configuration in order to stabilize the operation, in addition to increasing the size of the opening. In other words, since the capacitance of the coil conductors is determined by the material between the coil conductors (the material of the sheets), the effect of the permittivity of an article to which the wireless IC tag 1A is to be attached is relatively small (the variation in stray capacitance does not easily occur) and the inductance of the coils is less varied. Accordingly, the resonant frequency is less varied and, thus, a constant communication distance is achieved. In particular, a material having a high permittivity can preferably be used for the substrate 21 to substantially determine the impedance of the coils in the substrate 21 and the wireless IC tag 1A is less affected by the environment in which the wireless IC tag 1A is used.

Figure 4:
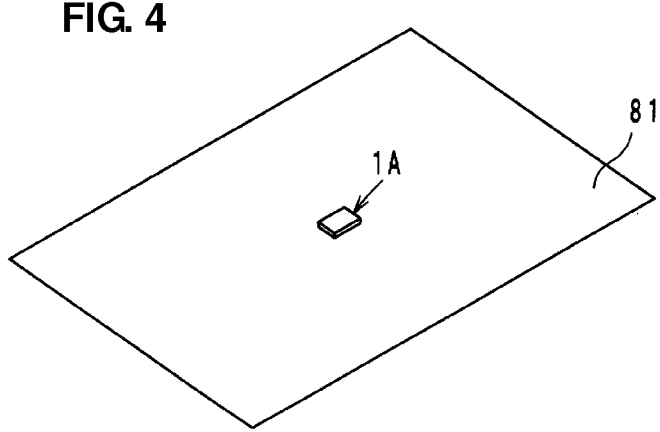
FIG. 4 is a perspective view showing a first example of how the wireless IC tag is mounted.

The wireless IC tag 1A is used while being attached to various articles. For example, the wireless IC tag 1A may preferably be used while being attached on a metal plate 81, as shown in FIG. 4. In this case, the side of the wireless IC chip 10 of the wireless IC tag 1A can be directed towards the metal plate 81 in order to achieve the reliable communication between the wireless IC tag 1A and the reader-writer 50. In this case, the sealing member 22 functions as a passage of the magnetic flux. Even when the antennas 20A and 20B are directed towards the metal plate 81 for attachment, it is possible to ensure the passage of the magnetic flux between the wireless IC tag 1A and the metal plate 81 by arranging the antennas 20A and 20B at an uppermost position of the substrate 21.

Figure 5:
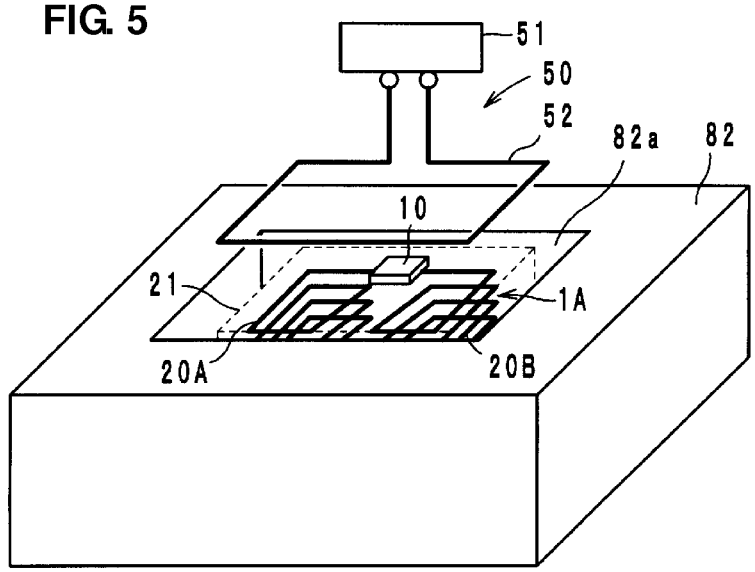
FIG. 5 is a perspective view showing a second example of how the wireless IC tag is mounted.

In addition, the wireless IC tag 1A may preferably be embedded in a recess 82a of a metal body 82, as shown in FIG. 5. Even when the antenna 52 of the reader-writer 50 has the same small size as the wireless IC tag 1A, the magnetic field can be concentrated in the tag 1A to achieve reliable communication. In this case, a gap is preferably provided between the wireless IC tag 1A and a wall portion of the recess 82a as a passage of the magnetic flux.

First Modification of Antenna of Reader-Writer

Figure 6:
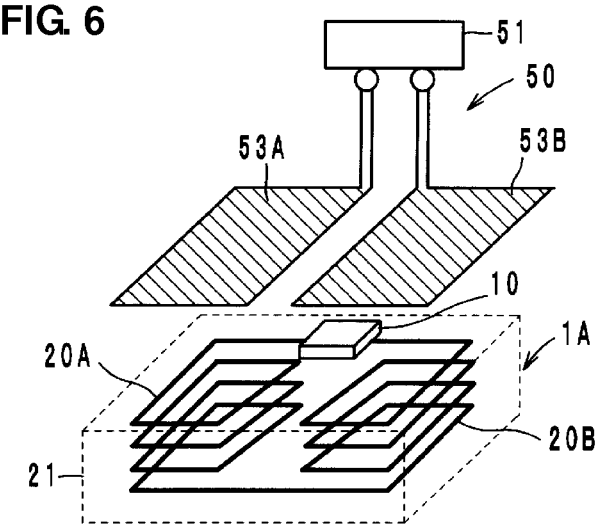
FIG. 6 is a perspective view showing a first modification of an antenna of a reader-writer.

The reader-writer 50 may preferably include planar electric field antennas 53A and 53B shown in FIG. 6, instead of the loop-shaped antenna. Since the coil-shaped antennas 20A and 20B of the wireless IC tag 1A are divided into two, a difference in voltage occurs in each of the antennas 20A and 20B to produce an electric field. Accordingly, it is possible to operate the reader-writer 50 even with the planar electric field antennas 53A and 53B.

Second Modification of Antenna of Reader-Writer

Figure 7:
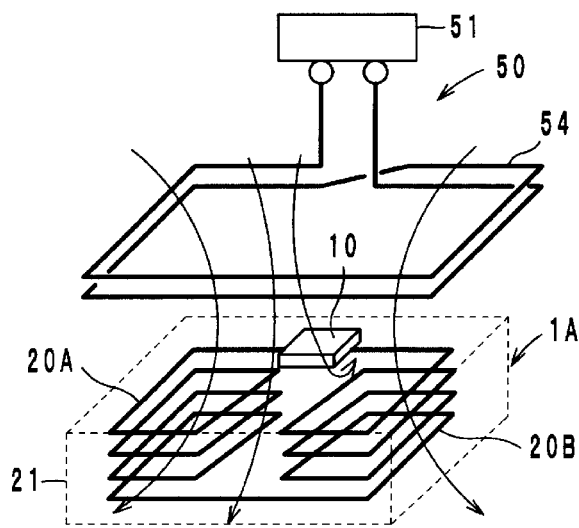
FIG. 7 is a perspective view showing a second modification of the antenna of the reader-writer.

The reader-writer 50 may preferably include a loop-shaped magnetic field antenna 54 having multiple turns, as shown in FIG. 7. The communication distance can be increased because of an increase in the strength of the magnetic field.

Third Modification of Antenna of Reader-Writer

Figure 8:
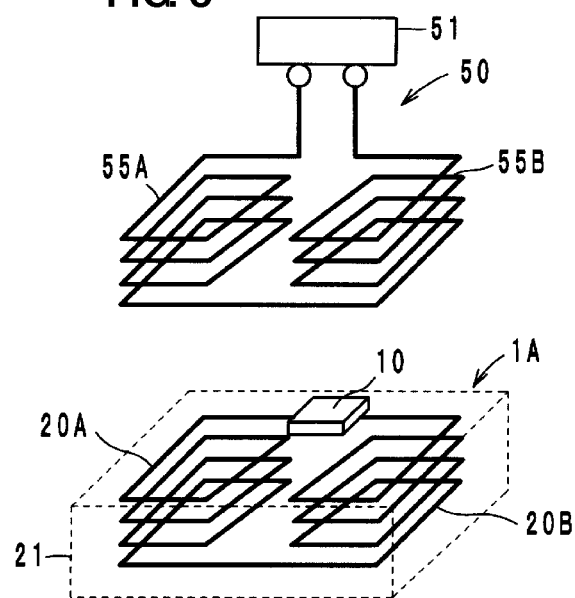
FIG. 8 is a perspective view showing a third modification of the antenna of the reader-writer.

The reader-writer 50 may preferably include a first coil-shaped antenna portion 55A and a second coil-shaped antenna portion 55B, similar to the coil-shaped antennas 20A and 20B, as shown in FIG. 8. One end of the coil-shaped antenna portion 55A and one end of the coil-shaped antenna portion 55B are electrically connected to the information processing circuit 51. The other end of the coil-shaped antenna portion 55A is electrically connected to the other end of the coil-shaped antenna portion 55B. The winding axes of the antenna portions 55A and 55B are preferably arranged at different positions in a plan view and the winding direction of the antenna portion 55A is preferably the same as that of the antenna portion 55B.

Since the coil-shaped antenna portions 55A and 55B preferably have the same winding direction, the coil-shaped antenna portions 55A and 55B have effects and advantages that are similar to those of the coil-shaped antennas 20A and 20B. Specifically, the energy transfer efficiency in the communication with the wireless IC tag is improved and the communication distance is increased. In addition, this contributes to a reduction in size of the reader-writer 50. When the antenna according to the third modification is used, the two coil-shaped antennas are not necessarily used for the wireless IC tag.

Fourth Modification of Antenna of Reader-Writer

Figure 9:
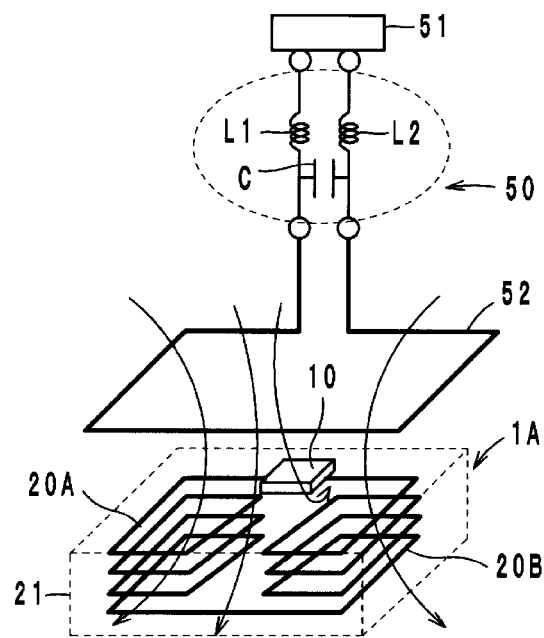
FIG. 9 is a perspective view showing a fourth modification of the antenna of the reader-writer.

As shown in FIG. 9, a matching circuit including inductors L1 and L2 and a capacitor C may preferably be provided between the antenna 52 and the information processing circuit 51 of the reader-writer 50. Since the impedance matching can be achieved at the usable frequency in this case, the energy transfer efficiency between the information processing circuit 51 and the antenna 52 is improved to increase the communication distance even with small power. The matching circuit may have a circuit configuration other than the one shown in FIG. 9.

Another Example of Information Processing System

Another example of the information processing system including the wireless IC tag 1A will now be described. Another wireless IC tag other than the wireless IC tag 1A may be used.

Figure 10:
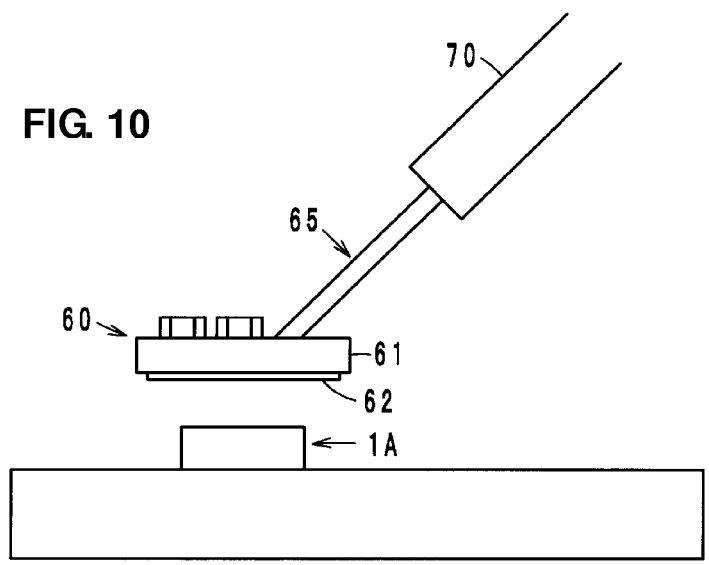
FIG. 10 is a descriptive view showing another example of the information processing system.
Figure 11A:
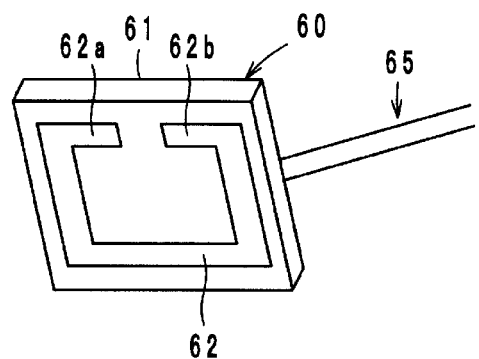

As shown in FIG. 10, this information processing system transfers information between a reader-writer and the wireless IC tag 1A in a non-contact manner and transmits and receives high-frequency signals within the UHF band or the super high frequency (SHF) band. As shown in FIG. 11A, the reader-writer preferably includes an antenna head 60 in which a loop antenna 62 is provided on a surface of a supporting member 61 made of a hard member, such as epoxy resin, for example. This loop antenna 62 includes a one-turn loop-shaped conductor including power feed portions 62a and 62b at both ends. The power feed portions 62a and 62b are connected to an information processing circuit (not shown) of the reader-writer via a coaxial cable 65. In this example, the power feed portions 62a and 62b are connected to an electrode on a surface opposite to the surface in which the antenna 62 is provided via through holes, and the electrode is connected to the coaxial cable 65. The wireless IC tag 1A is described as the first preferred embodiment with reference to FIG. 2 and FIG. 3.

Figure 11B:
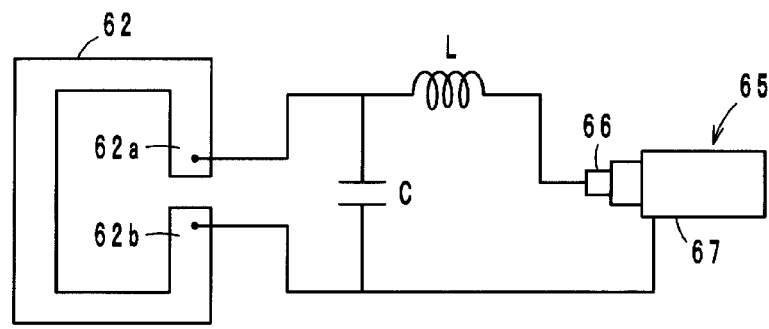

As shown in FIG. 11B, a matching circuit including a capacitance element C and an inductance element L is provided between the coaxial cable 65 and the loop antenna 62. The power feed portion 62a is connected to an internal conductor 66 of the coaxial cable 65 via the matching circuit, and the power feed portion 62b is connected to an external conductor 67 of the coaxial cable 65 via the matching circuit. The capacitance element C and the inductance element L can preferably be arranged on a surface opposite to the surface on which the antenna is provided to ensure the distance from the antenna 62 and to provide the matching circuit with the antenna 62 with a small area without blocking the magnetic field occurring from the antenna 62. The coaxial cable 65 preferably includes a 50Ω line and the impedance matching between the coaxial cable 65 and the loop antenna 62 is performed by the matching circuit. As shown in FIG. 10, the antenna head 60, which is mounted to a grip portion 70 via the coaxial cable 65, is a pen-type head capable of being used while being gripped by a person with his/her hand.

The information processing system is used in a mode in which the antenna of the reader-writer is close to the wireless IC tag and performs the communication only with target wireless IC tags.

Second Preferred Embodiment

Figure 12:
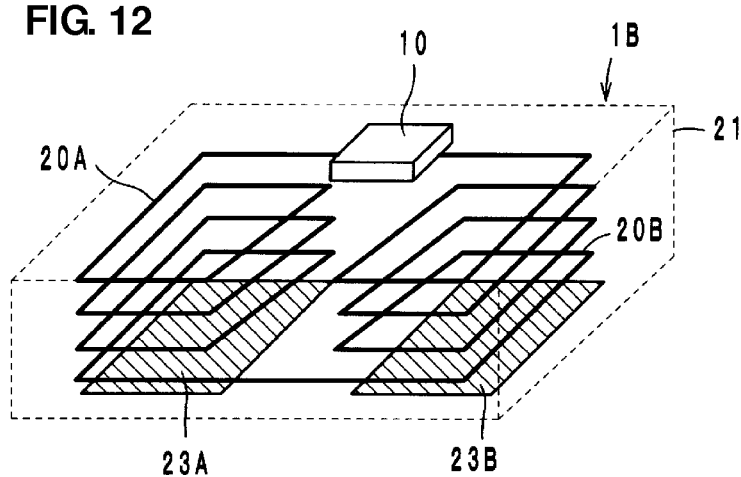
FIG. 12 is a perspective view showing a wireless IC tag according to a second preferred embodiment of the present invention.

A wireless IC tag 1B according to a second preferred embodiment of the present invention preferably includes outer electrodes 23A and 23B provided on a surface (bottom surface) of the substrate 21 including the antennas 20A and 20B so as to oppose the antennas 20A and 20B, respectively, as shown in FIG. 12. The remaining configuration of the wireless IC tag 1B is preferably the same or substantially the same as that of the wireless IC tag 1A. The outer electrodes 23A and 23B enable the wireless IC tag 1B to be soldered to an article, such as a printed wiring board, for example.

Bringing a probe (not shown) into contact with the outer electrodes 23A and 23B or positioning the probe close to the outer electrodes 23A and 23B enables the wireless IC tag 1B to operate. The probe preferably has an impedance that is a conjugate of the impedance between the outer electrodes 23A and 23B. As described above, a difference in voltage occurs between the antennas 20A and 20B and a difference in voltage also occurs between the outer electrodes 23A and 23B capacitively or electromagnetically coupled to the antennas 20A and 20B, respectively. Accordingly, bringing the probe into contact with the outer electrodes 23A and 23B or positioning the probe close to the outer electrodes 23A and 23B to cause the differences in voltage enables the wireless IC tag 1B to operate. Although it is necessary to keep a constant distance between the antenna 52 and the wireless IC tag 1B during the reading with the antenna 52, such a problem does not occur during the reading with the probe and it is possible to achieve a reliable reading. In addition, it is also possible to measure the impedance between the outer electrodes 23A and 23B, thus detecting an abnormality in the internal wiring of the wireless IC tag 1B.

Figure 13:
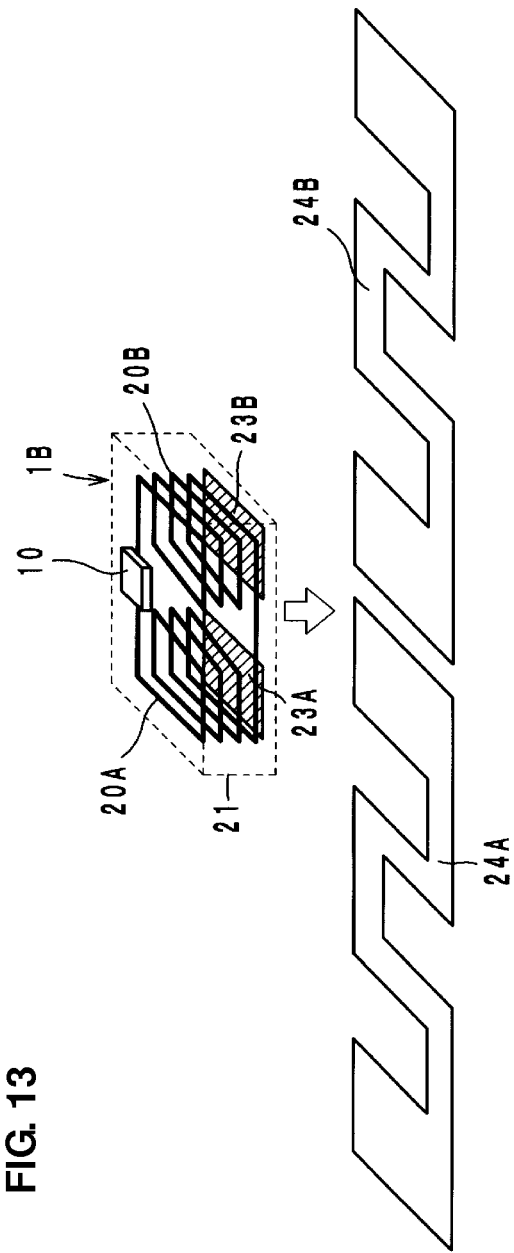
FIG. 13 is a perspective view showing the wireless IC tag shown in FIG. 12 and boost antennas.

In the wireless IC tag 1B, meander-shaped boost antennas 24A and 24B may preferably be connected to the outer electrodes 23A and 23B, respectively, as shown in FIG. 13. Although the boost antennas 24A and 24B are preferably electric-field emission type boost antennas, loop-shaped magnetic-field emission type boost antennas may also be used.

In other words, the formation of the outer electrodes 23A and 23B on the surface of the substrate 21, as in the second preferred embodiment, enables the wireless IC tag to be operated with the probe and enables the communication with the reader-writer in a relatively remote state to established, in addition to the communication with the reader-writer established in a relatively close state.

Third Preferred Embodiment

Figure 14:
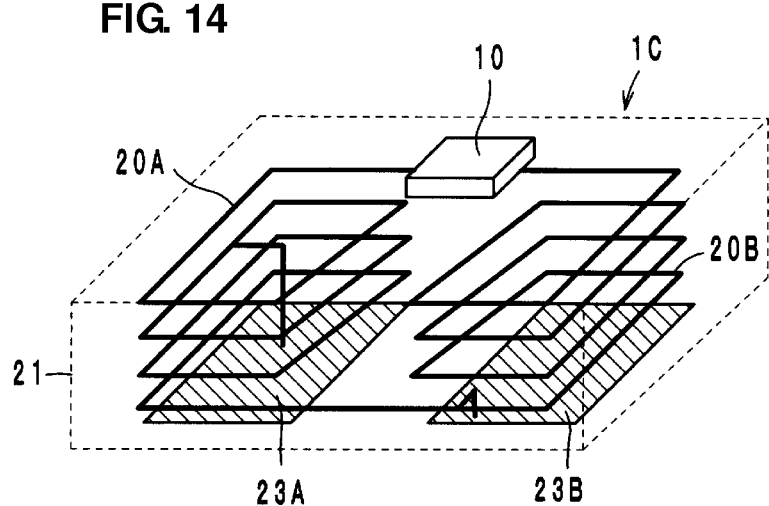
FIG. 14 is a perspective view showing a wireless IC tag according to a third preferred embodiment of the present invention.
Figure 15:
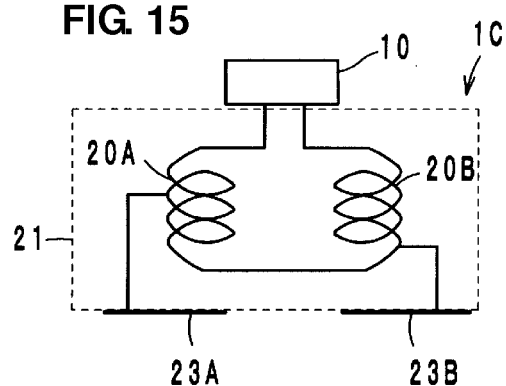
FIG. 15 is an equivalent circuit diagram of the wireless IC tag shown in FIG. 14.

In a wireless IC tag 1C according to a third preferred embodiment of the present invention, the outer electrodes 23A and 23B provided on the wireless IC tag 1B are preferably electrically connected to the coil-shaped antennas 20A and 20B, respectively, as shown in FIG. 14. An equivalent circuit of the wireless IC tag 1C is shown in FIG. 15. Alternatively, a capacitance C1 may be provided between the outer electrode 23A and the coil-shaped antenna 20A and a capacitance C2 may be provided between the outer electrode 23B and the coil-shaped antenna 20B (refer to FIG. 16).

Figure 16:
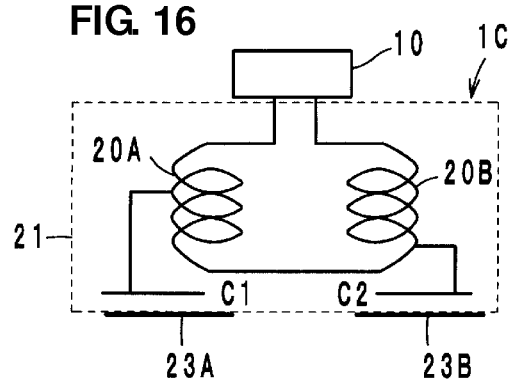
FIG. 16 is an equivalent circuit diagram of a modification of the wireless IC tag shown in FIG. 14.

Directly electrically connecting the outer electrodes 23A and 23B to the coil-shaped antennas 20A and 20B, respectively, as shown in FIG. 14, enables the relationship in voltage between the outer electrodes 23A and 23B and the coil-shaped antennas 20A and 20B to be easily determined, thus easily setting the impedance of the outer electrodes 23A and 23B to various values. Connecting the outer electrodes 23A and 23B to the coil-shaped antennas 20A and 20B via the capacitances C1 and C2, respectively, as shown in FIG. 16, enables the wireless IC chip 10 to be protected from static electricity because the outer electrodes 23A and 23B are not directly connected to the wireless IC chip 10.

Fourth Preferred Embodiment

Figure 17A:
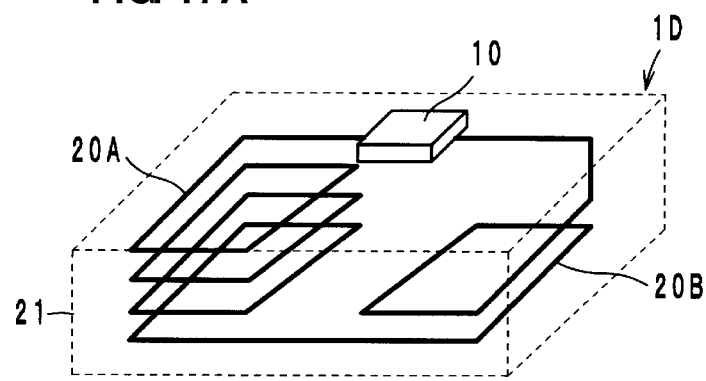
FIGS. 17A and 17B are perspective views showing a wireless IC tag according to a fourth preferred embodiment of the present invention.
Figure 17B:
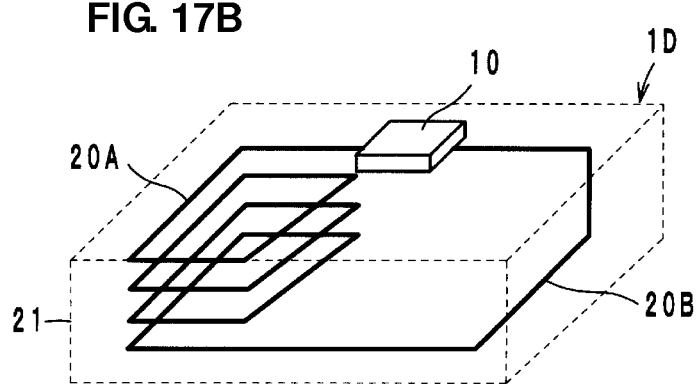

In a wireless IC tag 1D according to a fourth preferred embodiment of the present invention, the two coil-shaped antennas 20A and 20B preferably have a different number of turns from one another, as shown in FIGS. 17A and 17B. The remaining configuration of the wireless IC tag 1D is the same or substantially the same as that of the wireless IC tag 1A. Even when the number of turns on the left side is different from the number of turns on the right side in the above-described manner, the effects and advantages are substantially similar to those of the wireless IC tag 1A. In addition, since the degree of freedom in design of the antennas 20A and 20B is improved and the antennas 20A and 20B have different inductances, the design of the impedance is facilitated with the outer electrodes 23A and 23B being provided.

Fifth Preferred Embodiment

Figure 18:
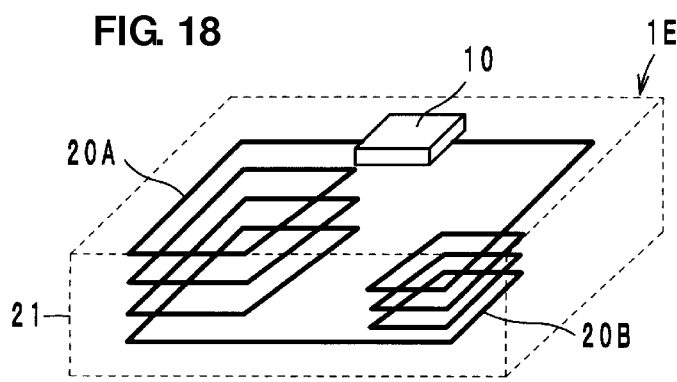
FIG. 18 is a perspective view showing a wireless IC tag according to a fifth preferred embodiment of the present invention.

In a wireless IC tag 1E according to a fifth preferred embodiment of the present invention, the two coil-shaped antennas 20A and 20B preferably have different sizes from one another, as shown in FIG. 18. The remaining configuration of the wireless IC tag 1E is the same or substantially the same as that of the wireless IC tag 1A. Even when the size on the left side is different from the size on the right side in the above-described manner, the effects and advantages are substantially similar to those of the wireless IC tag 1A. In addition, since the degree of freedom in design of the antennas 20A and 20B is improved and the antennas 20A and 20B have different inductances, the design of the impedance is facilitated with the outer electrodes 23A and 23B being provided.

Sixth Preferred Embodiment

Figure 19A:
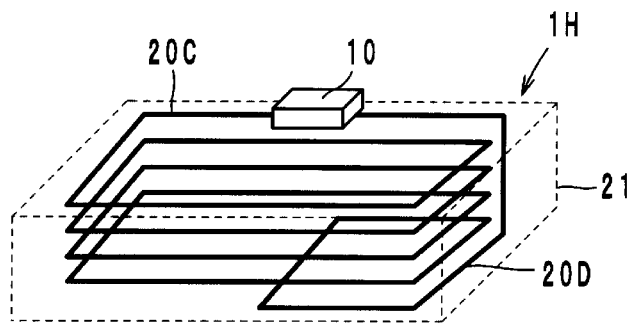
FIGS. 19A to 19C are perspective views showing a wireless IC tag according to a sixth preferred embodiment of the present invention.
Figure 19B:
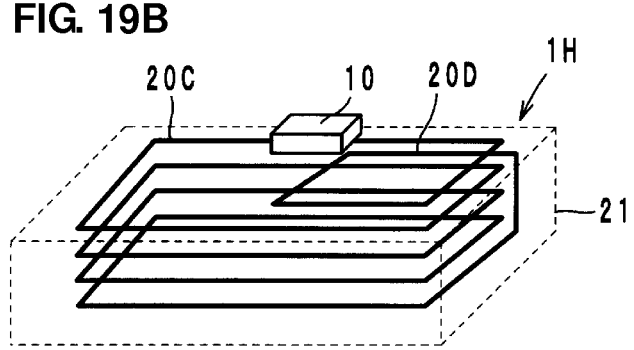
Figure 19C:
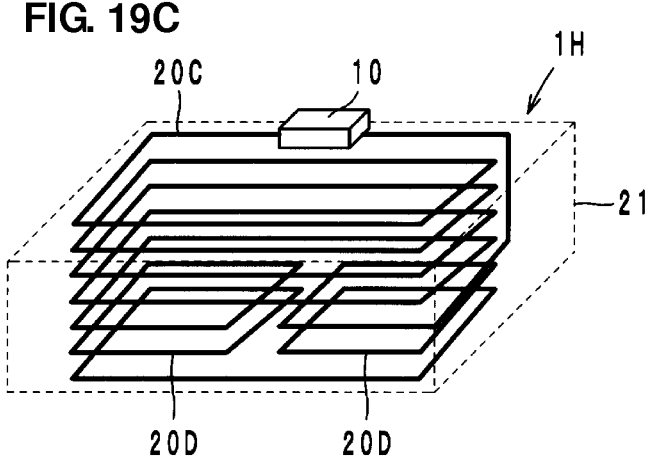

In a wireless IC tag 1H according to a sixth preferred embodiment of the present invention, a coil-shaped large-diameter antenna 20C wound on the substantially entire area of the substrate 21 is preferably combined with a coil-shaped small-diameter antenna 20D, as shown in FIGS. 19A to 19C. The remaining configuration of the wireless IC tag 1H is the same or substantially the same as that of the wireless IC tag 1A.

FIG. 19A shows a case in which the coil-shaped small-diameter antenna 20D is arranged immediately below the coil-shaped large-diameter antenna 20C such that the coil-shaped large-diameter antenna 20C and the coil-shaped small-diameter antenna 20D preferably have different winding axes. FIG. 19B shows a case in which the coil-shaped small-diameter antenna 20D is arranged immediately over the coil-shaped large-diameter antenna 20C so that the coil-shaped large-diameter antenna 20C and the coil-shaped small-diameter antenna 20D preferably have different winding axes. FIG. 19C shows a case in which the two coil-shaped small-diameter antennas 20D are arranged immediately below the coil-shaped large-diameter antenna 20C so that the coil-shaped large-diameter antenna 20C and the coil-shaped small-diameter antennas 20D preferably have different winding axes. These two coil-shaped small-diameter antennas 20D may alternatively be arranged immediately over the coil-shaped large-diameter antenna 20C.

When the coil-shaped large-diameter antenna 20C is combined with the coil-shaped small-diameter antenna 20D as in the sixth preferred embodiment, the large-diameter antenna 20C functions as a main antenna for communication to increase the communication distance. The small-diameter antenna 20D functions as a sub-antenna for communication and also functions as an impedance matching adjustment element. In addition, the arrangement of the small-diameter antenna 20D at the side near the wireless IC chip 10, as shown in FIG. 19B, further facilitates the impedance adjustment with the small-diameter antenna 20D.

The number of the coil-shaped antennas may be three or more in the preferred embodiments described above, for example. For example, another coil-shaped antenna may be provided between the coil-shaped antennas 20A and 20B.

Seventh Preferred Embodiment

Figure 20A:
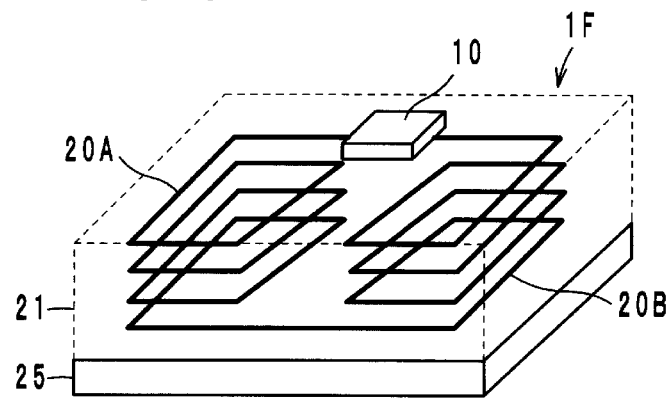
FIGS. 20A and 20B are perspective views showing a wireless IC tag according to a seventh preferred embodiment of the present invention.
Figure 20B:
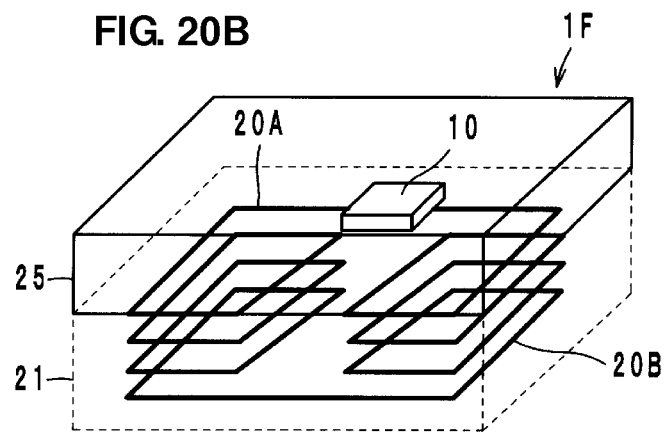

In a wireless IC tag 1F according to a seventh preferred embodiment of the present invention, a ferrite sheet 25 is preferably attached on a bottom surface of the substrate 21, as shown in FIG. 20A. The remaining configuration of the wireless IC tag 1F is the same or substantially the same as that of the wireless IC tag 1A. The ferrite sheet 25 may preferably be attached on the top surface of the substrate 21, as shown in FIG. 20B. When the ferrite sheet 25 is provided on the top surface of the substrate, the ferrite sheet 25 also functions as a protective layer of the wireless IC chip 10. The ferrite sheet 25 may preferably be provided on the top surface of the sealing member 22 shown in FIG. 2.

When the wireless IC tag is attached on the metal plate 81, as shown in FIG. 4, the communication distance is decreased because the metal plate 81 blocks the passing-through of the magnetic field. However, the ferrite sheet 25 provided on the bottom surface of the substrate 21 causes the magnetic field to pass through the ferrite sheet 25 to increase the communication distance.

Eighth Preferred Embodiment

Figure 21:
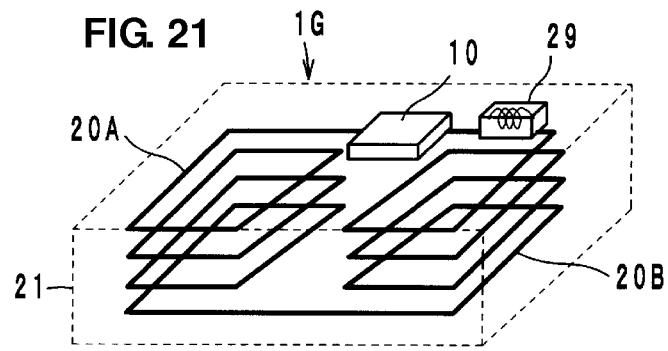
FIG. 21 is a perspective view showing a wireless IC tag according to an eighth preferred embodiment of the present invention.

In a wireless IC tag 1G according to an eighth preferred embodiment of the present invention, a chip component (for example, an inductor or a capacitor) is preferably provided on the substrate 21, as shown in FIG. 21. The chip component 29 may be provided in the coil-shaped antenna 20A or 20B in the circuit. The remaining configuration of the wireless IC tag 1G is the same or substantially the same as that of the wireless IC tag 1A. A capacitor may be installed in parallel to the wireless IC chip 10.

The wireless IC tag, the reader-writer, and the information processing system according to the present invention are not limited to the preferred embodiments described above, and changes and variations may be made within the spirit and scope of the present invention.

For example, although the wireless IC chip preferably is mounted on the substrate at a location at which the antennas are provided in the above-described preferred embodiments, the wireless IC chip may be mounted in the substrate. Alternatively, the antennas may be provided on a re-wiring layer of the wireless IC chip.

As described above, preferred embodiments of the present invention are useful for a wireless IC tag, a reader-writer, and an information processing system. In particular, preferred embodiments of the present invention are superior in the improved energy transfer efficiency between the antenna of the reader-writer and the antennas of the wireless IC tag and the increased communication distance.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An information processing system for performing wireless communication comprising:
  a wireless IC tag; and
  a reader-writer; wherein
  the wireless tag includes a wireless IC chip and at least two coil-shaped antennas;
  a first end of each of the at least two coil-shaped antennas is electrically connected to the wireless IC chip and second ends of the at least two coil-shaped antennas are electrically connected to each other;
  winding axes of the at least two coil-shaped antennas are arranged at different positions and the at least two coil-shaped antennas have a same winding direction;
  the reader-writer includes a reader-writer antenna and an information processing portion;
  the reader-writer antenna has a size substantially equal to a size of the at least two coil-shaped antennas of the wireless IC tag;
  a first end of the reader-writer antenna is electrically connected to a first end of the information processing portion, and a second end of the reader-writer antenna is electrically connected to a second end of the information processing portion;
  the at least two coil-shaped antennas of the wireless IC tag are wound and connected to each other so as to produce in-phase magnetic fields;

the reader-writer antenna and the at least two coil shaped antennas of the wireless IC tag are overlaid directly on top of each other during communication; and the reader-writer antenna has a diameter substantially equal to a sum of diameters of the at least two coil-shaped antennas.

2. The wireless IC tag according to claim 1, wherein each of the at least two coil-shaped antennas includes a plurality of coil conductors stacked in a substrate.

3. The wireless IC tag according to claim 2, wherein the plurality of coil conductors are arranged so that the plurality of coil conductors are overlaid on one another in the direction of the winding axes in a plan view.

4. The wireless IC tag according to claim 2, wherein the wireless IC chip is disposed on the substrate and is covered with a sealing member.

5. The wireless IC tag according to claim 2, wherein a ferrite layer is provided on at least one of a top surface and a bottom surface of the substrate.

6. The wireless IC tag according to claim 2, wherein the at least two coil-shaped antennas are provided in the substrate and an outer electrode is provided on the substrate.

7. The wireless IC tag according to claim 6, wherein the at least two coil-shaped antennas are electrically connected to the outer electrode.

8. The wireless IC tag according to claim 6, further comprising at least one boost antenna arranged to oppose the outer electrode.

9. The information processing system according to claim 1, wherein the reader-writer includes a matching circuit provided between the reader-writer antenna and the information processing portion.

10. The information processing system according to claim 1, wherein the reader-writer antenna includes a loop-shaped magnetic field antenna including multiple turns.

11. The information processing system according to claim 1, wherein the reader-writer antenna includes a first coil-shaped antenna portion and a second coil-shaped antenna portion.

12. The information processing system according to claim 11, wherein each of the first coil-shaped antenna portion and the second coil-shaped antenna portion of the reader-writer antenna include a loop-shaped magnetic field antenna including multiple turns.

13. The information processing system according to claim 1, wherein the reader-writer includes a grip portion and an antenna head which is a pen-shaped head including the reader-writer antenna.

* * * * *